United States Patent Office 3,215,604
Patented Nov. 2, 1965

3,215,604
COPPER SULFATE STABILIZED COLORED
HAIR SETTING COMPOSITION
Alfred R. Biamonte, Westfield, N.J., assignor to Warner-Lambert Pharmaceutical Company, Morris Plains, N.Y., a corporation of Delaware
No Drawing. Filed Sept. 30, 1963, Ser. No. 312,338
4 Claims. (Cl. 167—87.1)

This invention relates to an improved light and color-stable hair setting composition. More particularly, this invention relates to a light and color-stable hair setting composition containing a water-soluble dyestuff and a minute color stabilizing amount of a soluble copper salt for stabilization of the composition against color changes which normally result upon exposure of the composition to ultraviolet light.

An object of this invention is to provide a colored hair setting composition containing a water-soluble dyestuff which is color-stable against color changes when exposed to light.

Another object of this invention is to provide an aqueous colored hair setting composition containing a water-soluble film-forming polymeric resin of improved color stability which is stabilized by addition of a soluble copper salt against color changes on exposure of said colored composition to ultraviolet light.

Other objects and advantages of this invention will become apparent from the following detailed description.

Wave set compositions for application to the hair are well known. These compositions generally consist of an aqueous solution of one or more complex water-soluble polymeric resins which function as film-forming agents, one or more surface active or wetting agents to aid in the dispersion or solubilization of various other components such as perfume oils, antibacterial agents, and the like, and a water-soluble dye to impart a color to the composition. Although the water-soluble dye present in the composition does not contribute to the function or the performance of the product, it lends appreciably to consumer appeal. However, it has been found that upon exposure to ultraviolet light a color change takes place under the action of the ultraviolet rays with the result that these colored compositions fade to unattractive shades. Although this change in shade cannot be specifically attributed to any particular reaction, it is believed that the composition and coloring dye react with each other upon exposure to ultraviolet light.

It has now been found that the addition of a minute color stabilizing amount of a soluble copper salt such as copper sulfate to these aqueous hair setting compositions containing a water-soluble dyestuff and a polymeric film-forming resin greatly improves the color stability of said compositions upon exposure to light.

The use of a water-soluble copper salt to effect the color stabilization of colored hair setting compositions is particularly effective where said hair setting compositions comprises an aqueous solution of polyacrylic acid as the film-forming resin, a dyestuff such as FD and C approved water-soluble dyes and various wetting and dispersing agents which includes materials such as sodium lauryl sulfate and isooctylphenylpolyethoxyethanol or similar alkyl aryl polyether alcohol. Auxiliary additives such as antibacterial and antifungal agents and polyethylene glycols for sheen may also be present.

When the ingredients as set forth above are combined to form a wave setting composition, the pH of the solution is then adjusted to a slightly alkaline pH of about 7.5 to about 9 by the addition of a base such as sodium hydroxide or other suitable alkali metal hydroxide. Any undissolved material may be removed from the formed solution by decantation, straining, or filtration, after which the copper salt may be added to the composition. The copper sulfate which is preferred for use herein has the general formula $CuSO_4.nH_2O$ where $n$ is about 5.

The copper sulfate is preferably added to the aqueous hair wave composition as a solution and is effective in amounts varying from trace amounts up to about 50 milligrams per liter. Preferably the copper sulfate is present in the hair conditioning solution in a quantity from about 5 to about 15 milligrams per liter.

When these hair waving compositions stabilized with copper sulfate are exposed to bright sunlight or ultraviolet rays for rapid ageing, they are found to exhibit a remarkable degree of color stability as compared to analogous compositions which do not contain the color stabilizing agent which are found to fade until they are substantially colorless.

The following examples are included to further illustrate the invention.

Example 1

A wave set is made from the following ingredients:

| Ingredients: | Amounts |
|---|---|
| Acrysol A–1 [1] | gm__ 38.0 |
| Sodium dehydroacetate | gms__ 2.5 |
| Triton X–100 [2] | ml__ 2.5 |
| Thimerosal NF | gm__ 0.1 |
| Sodium hydroxide, USP | gms__ 5.0 |
| Water, q.s. | liter__ 1 |
| Cologne | gm__ 0.5 |

[1] Trademark of Rohm & Haas Co., Philadelphia, Pa., for thickeners based on an aqueous solution of sodium polyacrylate and related polymeric acrylic salts.
[2] Trademark of Rohm & Haas Co., Philadelphia, Pa., for a surfactant based on alkylaryl polyether alcohols.

The above ingredients are dissolved in water and the pH of the solution is adjusted to 7.5 with the sodium hydroxide. Thereafter, 0.2 ml. of FD and C Blue No. 1 coloring (0.5% solution by weight) is added to the composition. FD & C Blue No. 1 (Brilliant Blue) comprises the disodium salt of 4-{[4-(N-ethyl-p-sulfobenzylamino)-phenyl]-(2 - sulfoniumphenyl)-methylene}-[1-(N-ethyl-N-p-sulfobenzyl)-Δ2,5-cyclohexadienimine]. Five 100 milliliter bottles are then placed in a fadeometer for 24 hours. The wave set solution exhibited substantial loss of color and sales appeal.

Example 2

A wave setting composition is made with the ingredients and by the procedure of Example 1 with the further addition 10 milligrams of copper sulfate color stabilizing agent ($CuSO_4.5H_2O$) per liter of wave set. Five 100 milliliter bottles of the composition are placed in a fadeometer for 24 hours. This wave setting composition containing the color stabilizing agent remains clear blue with no detectable change in color.

Wave setting compositions containing essentially the same ingredients set forth in Example 1 and containing the following water-soluble dyes may also be stabilized by the practice of the present invention:

FD & C Red No. 4 (Ponceau SX)—disodium salt of 2-(5-sulfo-2,4-xylylazo)-1-naphthol-4-sulfonic acid.

FD & C Yellow No. 5 (Tartrazine)—trisodium salt of 3 carboxy - 5 - hydroxy - 1-p-sulfophenyl-4-p-sulfophenyl-azo-pyrazole.

FD & C Green No. 1 (Guinea Green B)—monosodium salt or 4 - [4-(N-ethyl-p-sulfobenzylamino)diphenyl-methylene] - [1 - (N - ethyl-N-p-sulfoniumbenzyl)-Δ2, 5-cyclohexadienimine].

It is to be understood that the foregoing detailed description is given merely by way of illustration and that variations may be made therein without departing from the spirit of the present invention.

What is claimed is:

1. An improved color-stable hair setting composition which comprises:
    (a) 38 gms. sodium polyacrylate;
    (b) 2.5 ml. alkylaryl polyether alcohol;
    (c) 2.5 gms. sodium dehydroacetate;
    (d) 0.1 gm. thimerosal;
    (e) 5 gms. sodium hydroxide;
    (f) 0.5 gms. cologne;
    (g) 0.2 ml. of a 0.5% by weight solution of a water-soluble dyestuff selected from the group consisting of FD & C Blue No. 1, FD & C Red No. 4, FD & C Yellow No. 5, and FD & C Green No. 1;
    (h) Water to form about 1 liter final composition; and
    (i) from trace amounts up to about 50 milligrams of copper sulfate stabilizing agent per liter of said final composition.

2. The improved color-stable hair setting composition as in claim 1 wherein the copper sulfate stabilizing agent has the formula $CuSO_4 \cdot nH_2O$ wherein $n$ is about 5.

3. An improved color-stable hair setting composition as in claim 1 wherein the copper sulfate stabilizing agent is present in an amount from trace amounts up to about 20 milligrams per liter of hair setting composition.

4. An improved color-stable hair setting composition as in claim 1 wherein the copper sulfate stabilizing agent is present in an amount from about 5 to about 15 milligrams per liter of hair setting composition.

References Cited by the Examiner
UNITED STATES PATENTS

| | | | |
|---|---|---|---|
| 2,305,356 | 12/42 | Luchenback | 167—87 |
| 2,678,901 | 5/54 | Fox et al. | 167—87 |

FOREIGN PATENTS

| | | |
|---|---|---|
| 790,749 | 9/35 | France. |
| 137,308 | 9/52 | Sweden. |

OTHER REFERENCES

Chemical Abstracts, vol. 41, page 7263f (1947).
Chemical Abstracts II, volume 54, column 1856f (1960).
Merck Index, 7th ed., Merck & Co., Rahway, N.J. (1960), page 1034.
Sagarin: Cosmetics-Science & Technology, Interscience Publishers, New York (1957), pages 1056 and 1077.
Sisley: Encyclopedia of Surface Active Agents, Chemical Publishing Co., New York (1952), page 503.

JULIAN S. LEVITT, *Primary Examiner.*